INVENTORS
DONALD F. PRICE
WILLIAM E. HAPPEL

May 23, 1961

D. F. PRICE ET AL 2,984,955

WORK DRIVE MECHANISM

Filed May 14, 1957

INVENTORS
DONALD F. PRICE
WILLIAM E. HAPPEL

BY Mason, Porter, Miller & Stewart

ATTORNEYS

May 23, 1961 D. F. PRICE ET AL 2,984,955
WORK DRIVE MECHANISM
Filed May 14, 1957 3 Sheets-Sheet 3

INVENTORS
DONALD F. PRICE
WILLIAM E. HAPPEL
BY Mason, Porter, Diller & Stanard
ATTORNEYS United States Patent Office 2,984,955
Patented May 23, 1961

2,984,955

WORK DRIVE MECHANISM

Donald F. Price, and William E. Happel, Waynesboro, Pa., assignors to Landis Tool Company, Waynesboro, Pa.

Filed May 14, 1957, Ser. No. 659,056

9 Claims. (Cl. 51—237)

The following specification relates to a two-speed work drive mechanism designed for use on a machine tool such as a grinding machine. Specifically the invention has been applied for the rotation of a work-piece such as a crankshaft during the grinding of the line bearings.

The improvement is directed to providing mechanically operating means for slowly rotating a work-piece so that driving engagement will be made with the flange of the work-piece, and the work-piece then rotated at a normal or faster speed during the grinding operation. At the conclusion of the grinding operation, the work-piece must be brought into a definite radial position to enable it to be removed from the grinding position by mechanical means.

One object of the invention is to rotate the drive means at a slow or creeping speed for a partial rotation until driving relation is established between the drive means and the work-piece.

A further object of the invention is to initiate a change in the speed of the drive means to a normal or higher driving speed as soon as the driving relation has been established.

Among the objects of the invention is to center the drive member with respect to the work center or spindle on which the work-piece is mounted.

It is also an object of the invention to equalize the application of driving force on the work-piece.

Other objects of the invention will be apparent from the following description of the preferred form of the invention.

For the purposes of example the invention has been illustrated on the accompanying drawings in which.

Figure 1:
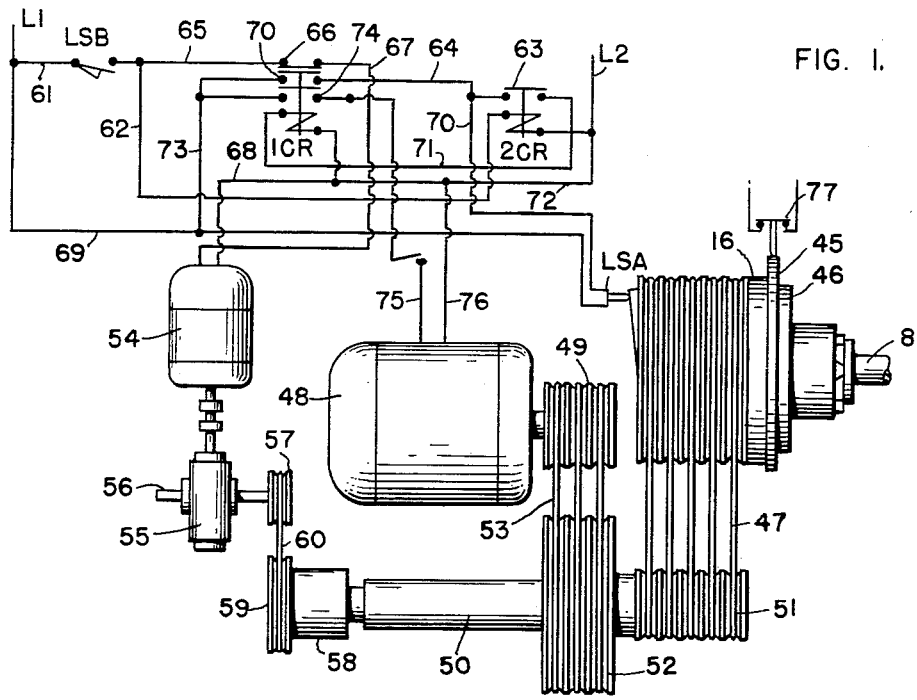
Fig. 1 is a plan view of the improved work drive mechanism with circuit diagram.

Briefly described the invention consists in mounting a rotatable work driver on a headstock spindle for engagement with and rotation of the work-piece indicated as a flanged crank shaft. The rotation of the driving means is done at a relatively slow speed until driving engagement is established with the work-piece. Thereafter the work-piece is driven at a higher or normal speed until the grinding operation is finished. At that moment the circuit of the driving motor is automatically interrupted, bringing the driving power to a stop with the work-piece properly oriented for engagement of the means by which the finished work is removed mechanically.

In the drawings the work-piece 8 has been illustrated as a crank shaft having a flange 9 at one end by which it is mounted upon the headstock of the grinding machine.

The headstock spindle 10 is mounted on the base 11. The spindle has a headstock center 12 for engagement centrally of the flange 9. The bearing consists of pairs of ball bearings 14, 14 separated by spacing rings 15, 15'. The inner ring 15 fits around the spindle 10 to separate the inner rings of bearings 14. The outer ring 15' fits in a pulley 16 in which the outer rings of the ball bearings 14 are held and serves to separate said outer rings.

The pulley 16 has a face plate 17 fixedly mounted upon the pulley and forming part thereof. The face plate 17 carries a carrying plate 18 firmly attached thereto. Beyond the carrying plate 18 is a hinge plate 19. Both the carrying plate and the hinge plate surround the center 12 in spaced relation.

A hinge stud 20 mounted upon the carrying plate 18 passes through the hinge plate 19 and forms a pivot for the latter. On the opposite side of the headstock center the carrying plate has an upstanding centering pin 21 passing through an enlarged hole in the hinge plate 19. Opposed springs 22, 22 recessed in the hinge plate resiliently hold the centering pin 21 centrally of the enlarged opening.

Figure 4:
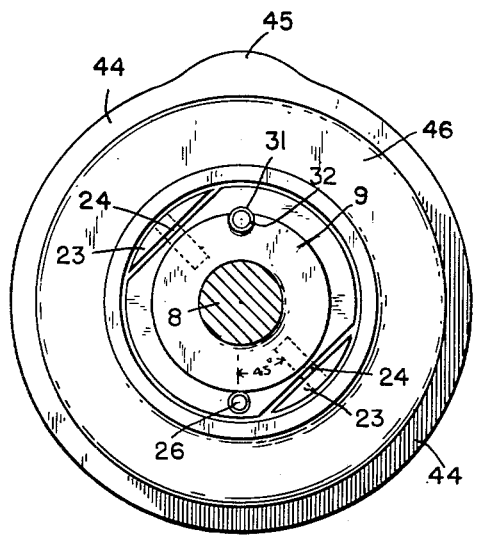
Fig. 4 is a front end elevation of the work holding mechanism with the work-piece partly in section.
Figure 5:
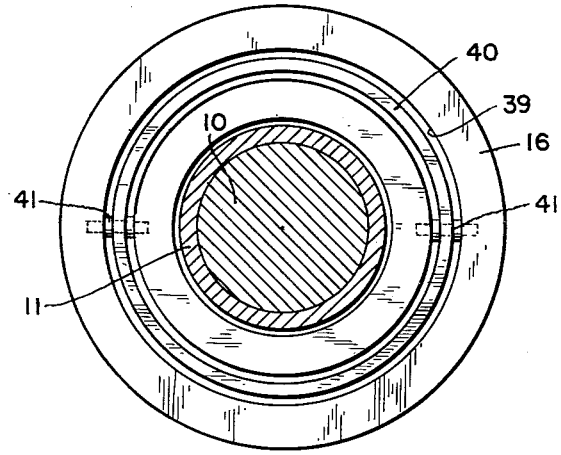
Fig. 5 is a rear end elevation of the pulley with the headstock in section.
Figure 6:
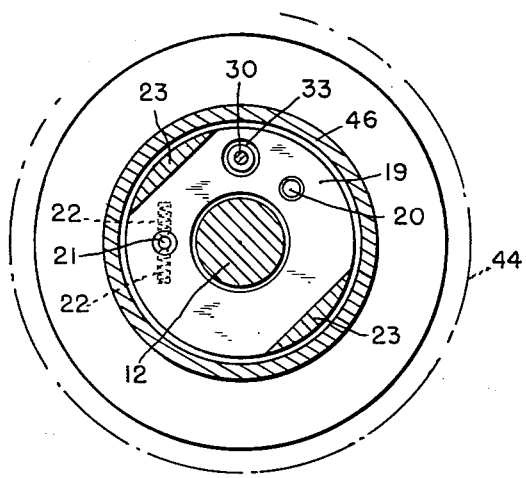
Fig. 6 is a vertical cross-section on the line 6—6 of Fig. 3.

Diametrically opposed cheek plates 23, 23 extend from the face of the hinge plate 19. These cheek plates have parallel inner faces as shown in Fig. 4.

The cheek plates 23 form support for a pair of diametrically opposed swivel studs 24. These studs extend radially inward and form mounts for a drive plate 25. This drive plate is therefore capable of tilting movement to adjust itself to the hinge plate on the one side and the flange 9 on the other.

On one side the drive plate 25 carries a driving stud 26. The driving stud 26 is located approximately 45° from the diameter of the swivel studs 24, 24. Diametrically opposed to the stud 26 there is a transverse enlargement 28 or recess in the drive plate passing from the face inward and connecting with a small hole 29.

A driving pin or dog 30 is journalled in the hole 29 and passes through the enlargement 28 with its enlarged head 31 extending above the face of the drive shaft opposite the drive stud 26.

The flange 9 of the work-piece has a notch 32 loosely fitting around the driving pin head 31 when the flange rests upon the driving stud 26.

A stop collar 33 is part of the drive pin 30 inwardly of the drive plate. A spring 34 in the recess 28 maintains the pin head 31 advanced with the stop collar 33 against the rear wall of the drive plate.

The hinge plate 19 is recessed to provide clearance for the inner end of the shaft of pin 30.

A recess 35 in the carrying plate 18 provides space to receive the end of the driving pin 30. A rock arm 36 is pivoted in the recess 35. At one end the rock arm is pivoted to the end of the pin 30.

The opposite end of the rock arm 36 is supported by a spring 37.

A plunger 38 extends through the pulley 16 and one end is against the upper end of the rock arm 36. The opposite end of the plunger is in a concentric groove 39 in the rear face of the pulley 16.

A tilt ring 40 is mounted in the groove 39 on swivel bearings 41, 41 at right angles to the plunger 38.

Figure 2:
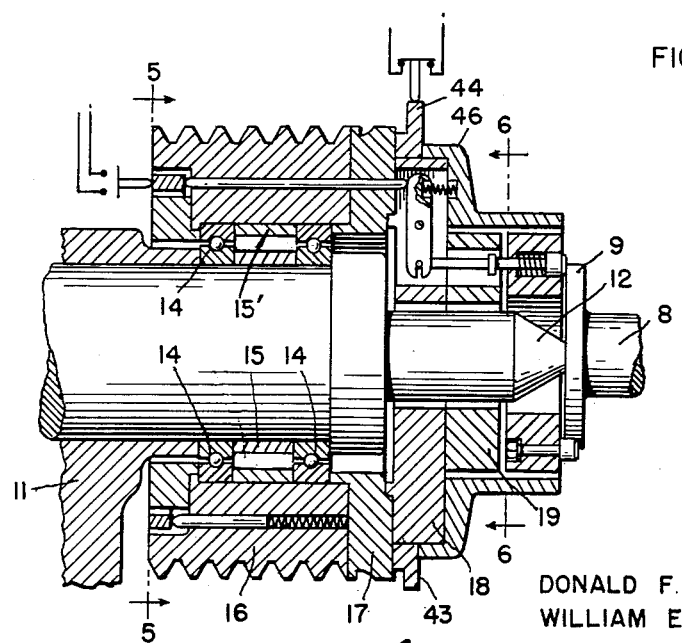
Fig. 2 is a vertical section of the mechanism in its initial position.
Figure 3:
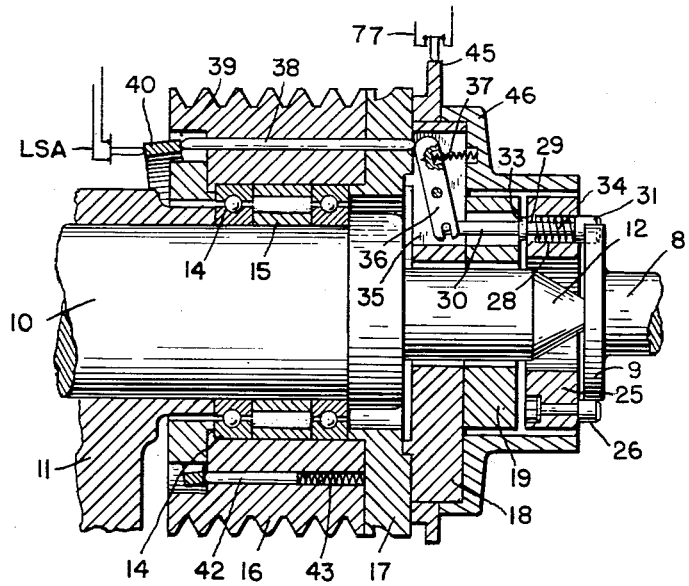
Fig. 3 is a similar section in work driving position.

The opposite side of the tilt ring rests against a tilt rod 42 carried in a recess in the pulley 16 and backed by a compression spring 43. The pressure from spring 43 will hold the tilt ring perpendicular to the axis of the pulley as shown in Fig. 2 and plunger 38 retracted when the driving pin head 31 is pressed in by the flange 9 of the work-piece. As the pulley is drawn slowly around, the head of the driving pin 30 drops into the notch 32 of the flange 9. This is represented in Fig. 3. Spring 34 then operates in connection with spring 37 to advance plunger 38 against the tilt ring 40. The tilt rod 42 then compresses spring 43.

The face plate 17 carries an angularly adjustable cam ring. The cam ring 44 has a protruding peripheral cam 45, shown on Fig. 4. This cam is used to operate an electric switch for the purpose of stopping rotation of the pulley 16 when the work-piece is rotated to the desired position for removal by suitable mechanical devices.

A shell 46 is attached to the carrying plate 18. It has a cylindrical projection which surrounds both the hinge plate 19 and the drive plate 25.

The pulley 16 is rotated selectively at different speeds. The pulley is grooved to hold multiple belts 47.

A main work drive motor 48 is mounted upon the base of the machine and has a pulley 49.

A countershaft 50 is mounted parallel to the main motor and to the pulley 16. This countershaft has a small pulley 51 engaged by the belt drive 47.

A large pulley 52 on the countershaft 50 is opposite the small pulley 49 on the shaft of the main motor. A multiple belt 53 connects pulleys 49 and 52.

The main drive motor will therefore transmit power to the pulley 16 and rotate the work-piece at the desired full speed during the grinding operation.

In order, however, to establish slower rotation of the pulley 16 and associated parts for the purpose of engaging the pin 30 in the notch 32 of the flange 9, a small motor 54 is provided. This motor drives a speed reducing gear 55. The output shaft 56 of the reducing gear carries a pulley 57.

The rear end of the countershaft 50 carries an overrunning clutch 58 which has a pulley 59 opposite pulley 57. A belt 60 connects pulleys 57 and 59.

The operation of the electric circuits is indicated diagrammatically on Fig. 1.

Direct current is supplied by lines L1 and L2.

Line 61 from L1 connects with a line switch LSB which is closed mechanically by movement of the foot stock center (not shown) to bring the work-piece into contact with the headstock center 12.

Current from LSB travels by line 62 through the second circuit relay 2CR and to the return line L2, closing contact 63 in an otherwise open line 64.

Current from LSB travels by line 65 through contacts 66 of a circuit relay 1CR, thence by way of 67 to the small motor 54 for slow speed of the headstock pulley 16. The motor is connected by lines 68 and 72 to L2. The motor rotates slowly to bring the driving pin head 31 into engagement with notch 32 in flange 9.

When the pin head 31 drops into notch 32, switch LSA is released to its normally closed position thus completing the circuit from L1 by way of line 69, LSA, line 70, previously closed contact 63, line 71, relay 1CR and line 72 to L2. Contact 70A of relay 1CR closes to complete a circuit from line 69 through 73, line 64, contact 63 of relay 2CR and line 71 to energize relay 1CR. This constitutes a holding circuit for the contacts at 1CR making the latter independent of the periodic opening and closing of LSA due to continued rotation of the headstock.

The work-piece having now been engaged by the pinhead 31 in drive plate 25, the latter should rotate at driving (grinding) speed. This is accomplished by current flowing from 69, line 73, through the lowermost contact 74 of 1CR and line 75 to motor 48. Line 75 has been shown to include a circuit-closing switch. This switch is closed by retraction of the endwise locating means, not shown, for the workpiece or otherwise. The current returns through line 76 to 72 and L2.

When the finished workpiece is removed from the machine, LSA is closed by spring 34 and remains closed until another workpiece is placed in the machine. LSB is released by withdrawal of the footstock (not shown) to open the circuit to relay 2CR, opening contact 63 to break the circuit to relay 1CR. It also opens the circuit to motor 54 for the slow speed work drive so that when relay 1CR is de-energized and normally closed contact 66 closes, motor 54 will not start. De-energizing relay 1CR also opens the circuit to high speed motor 48.

By the above arrangement the workpiece 8 is held on the spindle center 12. Slow rotation of the pulley 16 by motor 54 brings the driving pin head 31 into the notch 32 thus rocking the rock arm 36. This extends the plunger 38 and tilts the ring 40. The current then operates motor 48 at full speed dominating the small slow speed motor 54 through the overrunning clutch 58, but motor 54 is stopped when LSA opens.

When the driving pin head 31 is in the notch 32, the flange of the work piece is held by the driving stud 26 on the opposite side of the center. However, the driving plate 25 rocks freely upon the studs 24, urging stud 26 into frictional driving engagement with flange 9 so that said flange is driven equally by pin head 31 and stud 26.

The face plate 17 forms part of the pulley 16. The carrying plate 18 is firmly held against the face plate 17. The hinge plate 19 in like manner is held by stud 20 against the face of the carrying plate 18. Angular adjustment of the hinge plate 19 is permitted by the pin 21 and the springs 22, 22. This occurs without interfering with the freedom of the movement of the driving pin 30.

At the conclusion of the grinding operation, the circuit breaker 77 is operated by the cam 45 to stop the workpiece in the desired position for its removal mechanically from the headstock.

The invention has been described and illustrated in its preferred form by way of example only. Changes in mechanical details and proportions are possible without departing from the invention as defined in the following claims.

What we claim is:

1. In combination with the headstock spindle of a machine tool, a pulley revoluble on the spindle, a drive plate carried by the pulley, a driving pin on the drive plate for driving engagement with a work-piece, a motor having a speed reducer, a second motor, a common drive from said motors to the pulley, circuit means for actuating the first named motor, a tilt ring carried by the pulley, linkage from the driving pin to the tilt ring, and independent circuit means for the second named motor actuated by the said linkage when the drive plate is in engagement with the work-piece.

2. In combination with the headstock spindle of a machine tool, a pulley revoluble on the spindle, a motor having a speed reducer connected to the pulley, a face plate on the pulley, a carrying plate on the face plate, a hinge plate adjustably mounted on the carrying plate, a drive plate swiveled on the hinge plate, a driving pin longitudinally slidable in the drive plate, linkage from the drive pin through the pulley, a tilt ring on the rear face of the pulley for operation by the said linkage, an independent motor means for the pulley and a circuit therefor actuated by the tilt ring for alternately actuating said motors.

3. In combination with the headstock spindle of a machine tool, a driving member rotatably mounted thereon for rotating a work-piece, a driving pin carried by said driving member for engaging the work-piece, a motor, a speed reducer driven by the motor, driving connections from said reducer to the driving member, a second motor, driving connections from said second motor to the driving member, and a motor control member carried on the driving member and actuated by said pin for selectively energizing said motors.

4. In combination with the headstock spindle of a machine tool, a driving member rotatably mounted thereon for rotating a work-piece, a driving pin carried by said driving member for engaging the work-piece, a motor, a speed reducer driven by the motor, driving connections from said reducer to the driving member; a second motor, driving connections from said second motor to the driving member and a motor control member carried on the driving member and actuated by said pin to energize the second named motor and to stop the first named motor.

5. In a machine tool, a work drive mechanism comprising a headstock spindle, a face plate, a driving dog on said face plate, resilient means urging said dog axially into operative engagement with a work-piece, a motor and speed reducing means for driving said work-piece at a relatively slow initial speed, control means for said motor including a limit switch, a second limit switch operable in response to the insertion of a work-piece in operating position opposite said face plate, to start said first named motor to rotate said face plate and said dog, and connections between said driving dog and said first named limit switch operable to stop the first named motor when said driving dog has been turned by said face plate to engage said work-piece.

6. In combination with the headstock spindle of a machine tool, means for driving a work-piece having a flange at one end and a notch in said flange, a driving member rotatable with said spindle having a resiliently mounted driving dog therein, a second driving dog on said driving member, means for rotating said spindle and said driving member at a slow rate until said first mentioned driving dog enters said notch, said driving member being movable slightly relative to said flange until said driving dog is in driving engagement with the side of said notch, said relative movement being effective to cause engagement between said oppositely positioned driving dog and the peripheral surface of said flange whereby to apply a driving force at two points on said flange.

7. In combination with the headstock spindle of a machine tool, a pulley revoluble on the spindle, a motor having a speed reducer connected to said spindle, a face plate on the pulley, a spring-pressed driving pin longitudinally slidable on said face plate, a motor independent of said first mentioned motor for driving said pulley, and a switch actuated by said driving pin for stopping said first mentioned motor and starting said independent motor.

8. In combination with the headstock spindle of a machine tool, a pulley on said spindle, a face plate on said pulley, a driving pin yieldably mounted in said face plate for engaging and driving a workpiece, a motor having a speed reducer connected to said pulley for driving said face plate at a very slow rate to permit said driving pin to engage a driving surface on said workpiece, a second motor connected to said pulley for driving said spindle at a conventional machining rate, a switch operable upon placing a workpiece in operative relation with said face plate to start said motor and speed reducer, a relay having a normally closed contact in the circuit from said switch to said motor, a second relay having a normally open contact in the circuit to the coil of said first mentioned relay, a circuit from said switch to the coil of said second relay, a second switch operable by said driving pin when it moves into engagement with a driving surface on said workpiece, a circuit through said second switch and the contact of said second relay to energize said first relay, said first relay being operable when energized, to open said normally closed contact and stop said motor and speed reducer and to close a second contact to start said second motor.

9. In combination with the headstock spindle of a machine tool, a pulley revoluble on the spindle, a motor and speed reducer connected to said pulley, a face plate on the pulley, work driving means on said face plate including a yieldable driving pin, a switch arranged to be actuated by said driving pin when said pin is in driving relation to a workpiece, a separate motor having connections with said pulley including a one-way clutch, means for starting said first motor to drive said face place at a very slow speed until said driving pin advances into operative relation with a workpiece, and means actuated by said switch for stopping said first mentioned motor and starting said second mentioned motor.

References Cited in the file of this patent
UNITED STATES PATENTS

| | | |
|---|---|---|
| 2,027,174 | Johnson | Jan. 7, 1936 |
| 2,191,137 | Trible | Feb. 20, 1940 |
| 2,264,160 | Flygare et al. | Nov. 25, 1941 |
| 2,592,071 | Russell | Apr. 8, 1952 |
| 2,772,527 | Farnam | Dec. 4, 1956 |
| 2,783,595 | Hill | Mar. 5, 1957 |